US012687610B2

(12) United States Patent (10) Patent No.: US 12,687,610 B2
Sumiya (45) Date of Patent: Jul. 21, 2026

(54) SENSOR EVALUATION DEVICE

(71) Applicant: DENSO CORPORATION, Kariya-city (JP)

(72) Inventor: Syoichiro Sumiya, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 529 days.

(21) Appl. No.: 17/934,085

(22) Filed: Sep. 21, 2022

(65) Prior Publication Data

US 2023/0010354 A1     Jan. 12, 2023

Related U.S. Application Data

(63) Continuation of application No. PCT/JP2021/008986, filed on Mar. 8, 2021.

(30) Foreign Application Priority Data

Mar. 23, 2020     (JP) ................................. 2020-051329

(51) Int. Cl.
G01S 13/931 (2020.01)
G01S 7/40 (2006.01)
(52) U.S. Cl.
CPC .............. G01S 7/40 (2013.01); G01S 13/931 (2013.01)

(58) Field of Classification Search
None
See application file for complete search history.

(56) References Cited

U.S. PATENT DOCUMENTS

| | | | |
|---|---|---|---|
| 2013/0002470 A1 | 1/2013 | Kambe et al. | |
| 2014/0368668 A1 | 12/2014 | Sasabuchi et al. | |
| 2015/0332101 A1 | 11/2015 | Takaki et al. | |
| 2017/0270798 A1 | 9/2017 | Ushiba et al. | |
| 2019/0241194 A1* | 8/2019 | Fukasawa | ............ G08G 1/0116 |
| 2020/0158822 A1* | 5/2020 | Owens | ................... H01Q 1/526 |

FOREIGN PATENT DOCUMENTS

| | | | |
|---|---|---|---|
| JP | 3736112 B2 * | 1/2006 | |
| JP | 2019152894 A | 9/2019 | |
| JP | 2019158390 A * | 9/2019 | |

* cited by examiner

*Primary Examiner* — Timothy A Brainard
(74) *Attorney, Agent, or Firm* — Precision Patents, P.C.

(57)     ABSTRACT
A sensor evaluation device evaluates a first sensor mounted on a sensor-mounting object. The sensor evaluation device is provided with a specific event detecting unit, and a recording unit. The specific event detecting unit detects a specific event which is at least one of (a) an unrecognized event where a second sensor mounted on the sensor-mounting object recognizes a first target whereas the first sensor does not recognize the first target, and (b) a misrecognized event where the first sensor recognizes a second target whereas the second sensor does not recognize the second target. The recording unit records information on the specific event when detecting the specific event.

6 Claims, 5 Drawing Sheets

SENSOR EVALUATION DEVICE

CROSS-REFERENCE TO RELATED APPLICATION

The present application is a continuation application of International Application No. PCT/JP2021/008986, filed on Mar. 8, 2021, which claims priority to Japanese Patent Application No. 2020-051329, filed on Mar. 23, 2020. The contents of these applications are incorporated herein by reference in their entirety.

BACKGROUND

Technical Field

This disclosure relates to a sensor evaluation device.

Background Art

A boundary recognition device recognizes a boundary by using a plurality of sensors mounted on a vehicle.

SUMMARY

In the present disclosure, provided is a sensor evaluation device as the following.

The sensor evaluation device configured to evaluate a first sensor mounted on a sensor-mounting object includes: a specific event detecting unit configured to detect a specific event which is at least one of (a) an unrecognized event where a second sensor mounted on the sensor-mounting object recognizes a first target whereas the first sensor does not recognize the first target, and (b) a misrecognized event where the first sensor recognizes a second target whereas the second sensor does not recognize the second target; and a recording unit configured to record information on the specific event when the specific event detecting unit detects the specific event.

DETAILED DESCRIPTION OF THE PREFERRED EMBODIMENTS

A boundary recognition device is described in Patent Document 1. The boundary recognition device recognizes a boundary by using a plurality of sensors mounted on a vehicle.

[PTL 1] JP2015-219569

As a result of detailed studies by the inventors, the following problem was found. The performance of a sensor is influenced by a mounting position of the sensor in a vehicle, weather and the like. Moreover, a preferable mounting position may vary depending on the type of the sensor. In order to determine the type of the sensor, the mounting position of the sensor and the like, it is necessary to perform evaluation of the sensor under the environment in which the sensor is used. In one aspect of the present disclosure, it is preferable to provide a sensor evaluation device that can be used to evaluate a sensor.

One aspect of the present disclosure is a sensor evaluation device configured to evaluate a first sensor mounted on a sensor-mounting object. The sensor evaluation device comprises a specific event detecting unit configured to detect a specific event which is at least one of (a) an unrecognized event where a second sensor mounted on the sensor-mounting object recognizes a first target whereas the first sensor does not recognize the first target, and (b) a misrecognized event where the first sensor recognizes a second target whereas the second sensor does not recognize the second target; and a recording unit configured to record information on the specific event when the specific event detecting unit detects the specific event.

A sensor evaluation device, which is one aspect of the present disclosure, can detect a specific event in a state where a first sensor is mounted on a sensor-mounting object. A sensor evaluation device, which is one aspect of the present disclosure, can record information on a specific event when it detects the specific event. For example, a user can evaluate the first sensor by analyzing information on the specific event.

Exemplary embodiments of the present disclosure are explained while referring to figures.

First Embodiment (1) Configuration of Sensor Evaluation Device 1

Figure 1:
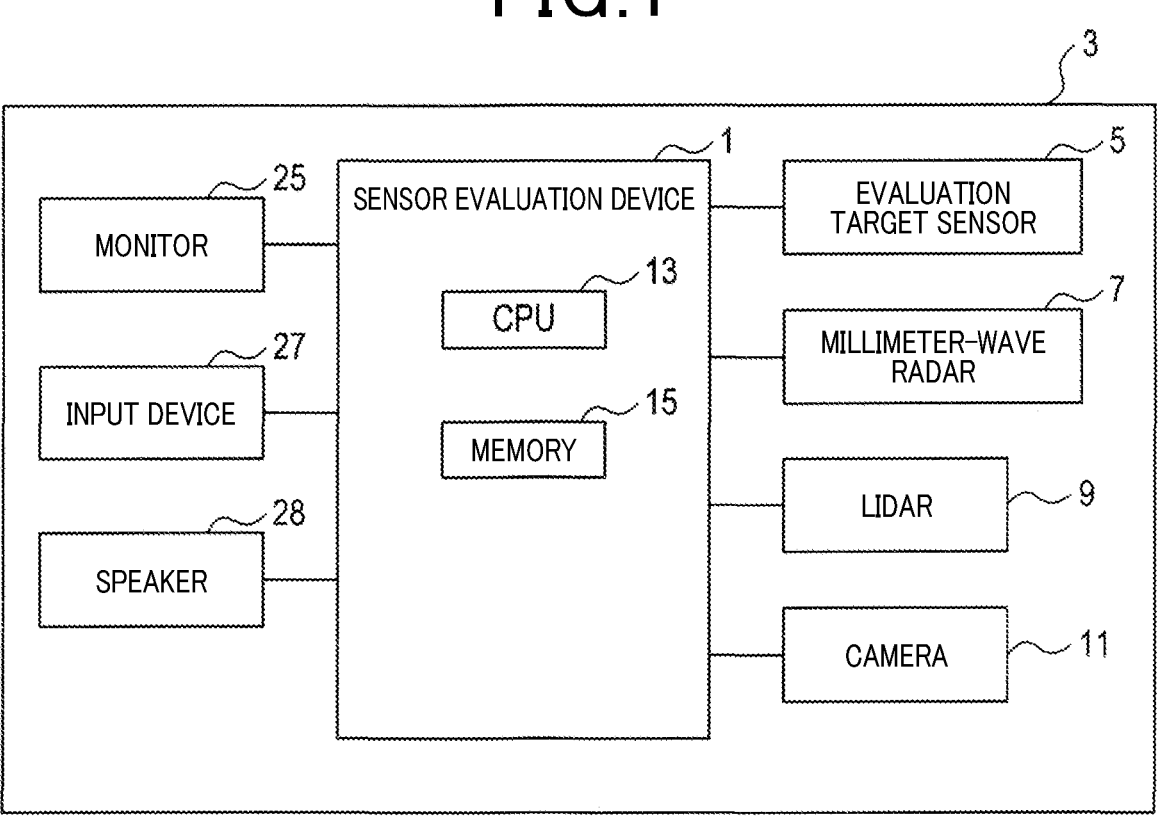
FIG. 1 is a block diagram showing a configuration of a sensor evaluation device.

The configuration of a sensor evaluation device 1 will be explained based on FIG. 1 and FIG. 2. As shown in FIG. 1, the sensor evaluation device 1 is mounted on a vehicle 3. The vehicle 3 corresponds to the sensor-mounting object. On the vehicle 3, an evaluation target sensor 5, millimeter-wave radar 7, LiDAR 9, and camera 11 are mounted.

The evaluation target sensor 5 is, for example, a camera, LiDAR, millimeter-wave radar, or sonar. The evaluation target sensor 5 corresponds to the first sensor. The millimeter-wave radar 7, LiDAR 9, and camera 11 correspond to the second sensors.

The evaluation target sensor 5, millimeter-wave radar 7, LiDAR 9, and camera 11 each can recognize a target present in the periphery of vehicle 3. The evaluation target sensor 5, millimeter-wave radar 7, LiDAR 9, and camera 11 have a common recognition range. Therefore, the evaluation target sensor 5, millimeter-wave radar 7, LiDAR 9, and camera 11 each can recognize one target present in the common recognition range if the environment and the like when recognizing the target are preferable.

The sensor evaluation device 1 is provided with a microcomputer having a CPU 13, a semiconductor memory (hereafter referred to as a memory 15) such as, for example, an RAM or ROM.

Each function of the sensor evaluation device 1 is realized by the CPU 13 performing a program stored in a non-transitory and substantive recording medium. In this example, the memory 15 corresponds to the non-transitory and substantive recording medium that stores the program. Moreover, by performing the program, a method corresponding to the program is performed. Incidentally, the sensor evaluation device 1 may be provided with one microcomputer, or it may be provided with a plurality of microcomputers.

Figure 2:
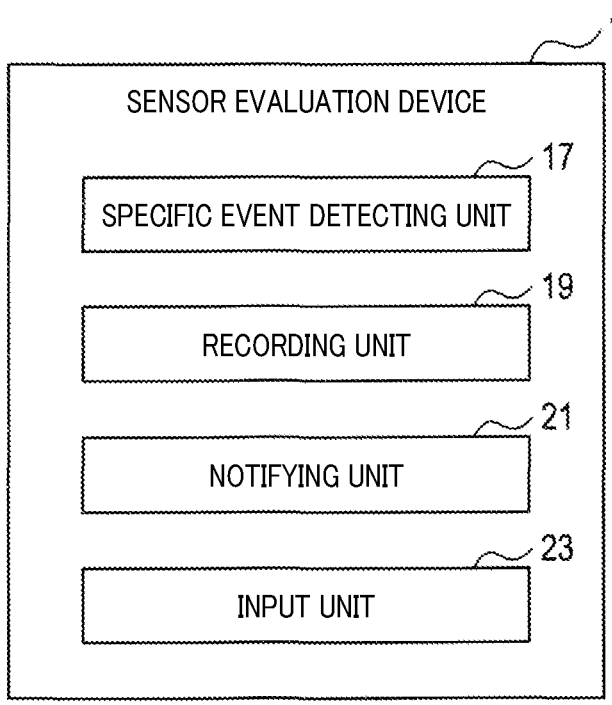
FIG. 2 is a block diagram showing a functional configuration of the sensor evaluation device.
Figure 3:
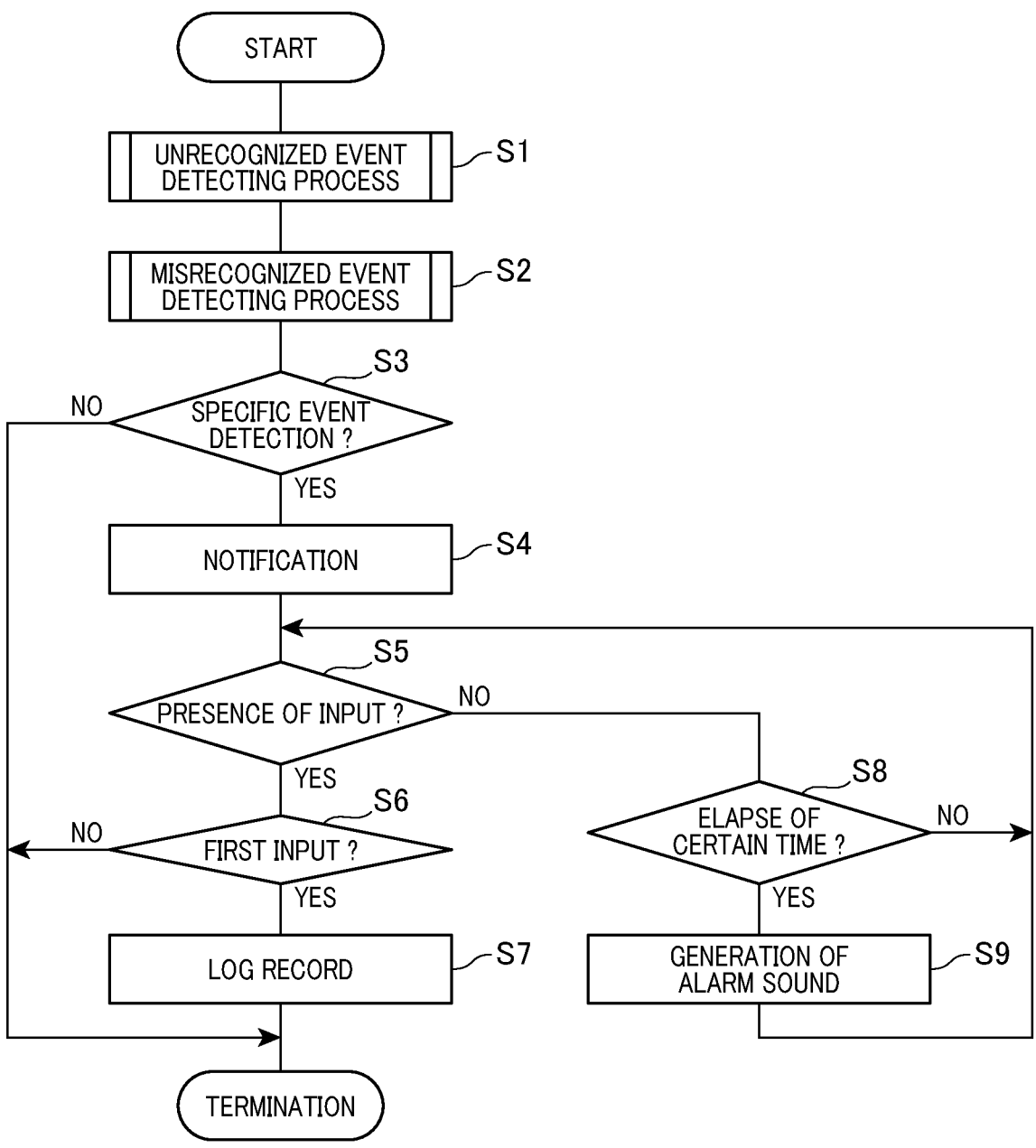
FIG. 3 is a flowchart showing the process that the sensor evaluation device performs.

As shown in FIG. 2, the sensor evaluation device 1 is provided with a specific event detecting unit 17, recording unit 19, notifying unit 21, and input unit 23.

The sensor evaluation device 1 can obtain recognition results of the target from the evaluation target sensor 5, millimeter-wave radar 7, LiDAR 9, and camera 11.

The sensor evaluation device 1 is connected to a monitor 25, input device 27, and speaker 28. The monitor 25, input device 27, and speaker 28 are mounted on the vehicle 3. The monitor 25 can display images based on signals delivered from the sensor evaluation device 1. An operator riding in the vehicle 3 can watch images displayed on the monitor 25.

An input device 27 accepts input by the operator. The input device 27 delivers signals responding to input to the sensor evaluation device 1. The input device 27 is, for example, a touch panel overlapping the screen of the monitor 25. The input device 27 may be any kind of switch, keyboard or the like.

The speaker 28 generates sounds based on signals delivered from the sensor evaluation device 1. The sounds may include an alarm sound.

(2) Process that the Sensor Evaluation Device 1 Performs

The process that the sensor evaluation device 1 performs will be explained based on FIG. 3 to FIG. 6. In step S1 of FIG. 3, the specific event detecting unit 17 performs the unrecognized event detecting process. The unrecognized event detecting process will be explained based on FIG. 4.

Figure 4:
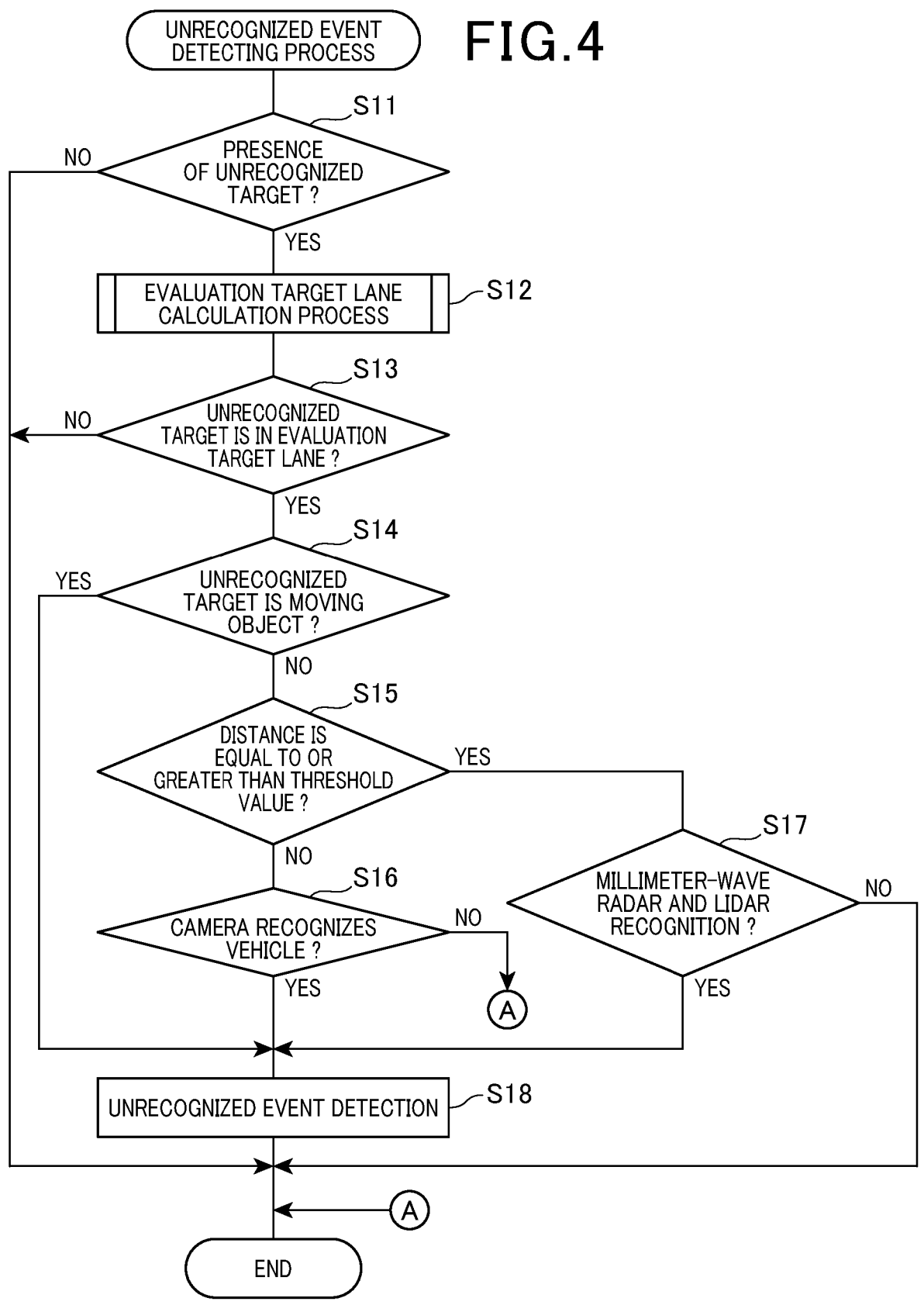
FIG. 4 is a flowchart showing the unrecognized event detecting process that the sensor evaluation device performs.
Figure 5:
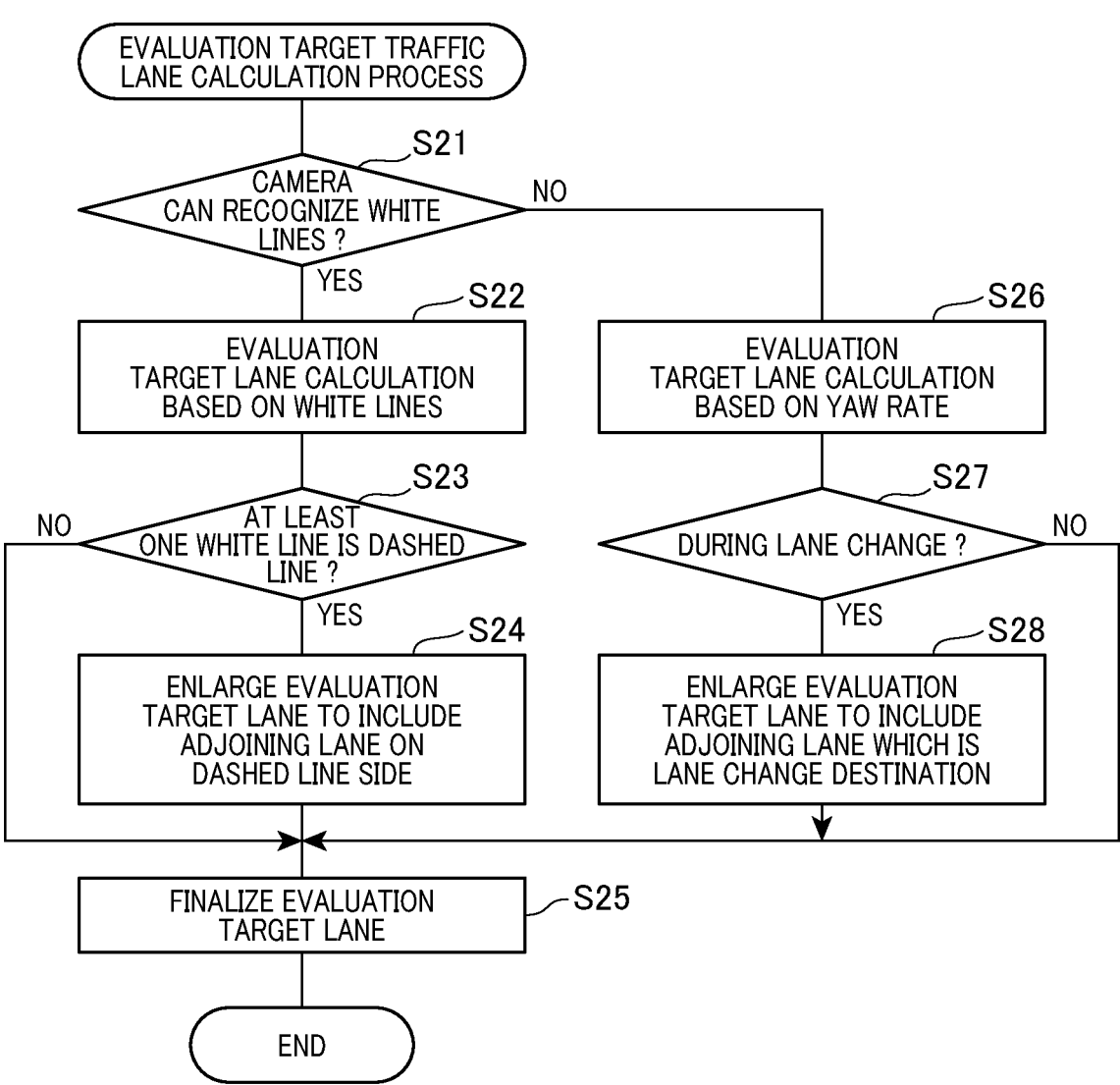
FIG. 5 is a flowchart showing the evaluation target lane calculation process that the sensor evaluation device performs.

In step S11 of FIG. 4, the specific event detecting unit 17 obtains the recognition results of the target from the evaluation target sensor 5, millimeter-wave radar 7, LiDAR 9, and camera 11. The specific event detecting unit 17 determines whether there is an unrecognized target based on the obtained recognition results of the target. An unrecognized target is a target that is recognized by one of the millimeter-wave radar 7, LiDAR 9, and camera 11, but is not recognized by the evaluation target sensor 5.

That is, when it is determined that there is an unrecognized target, it is a case where the evaluation target sensor 5 does not recognize the unrecognized target at the location where one of the millimeter-wave radar 7, LiDAR 9, and camera 11 recognized the unrecognized target. When there is an unrecognized target, the process proceeds to step S12. When there is no unrecognized target, the unrecognized event detecting process terminates.

In step S12, the specific event detecting unit 17 performs the evaluation target lane calculation process. The evaluation target lane calculation process will be explained based on FIG. 5. In step S21 of FIG. 5, the specific event detecting unit 17 determines whether white lines could be recognized by the camera 11. When the white lines could be recognized, the process proceeds to step S22. When the white lines could not be recognized, the process proceeds to step S26.

In step S22, the specific event detecting unit 17 calculates the evaluation target lane based on the white lines that could be recognized. The evaluation target lane is a lane which is marked off by the white lines and in which the vehicle 3 is traveling.

In step S23, the specific event detecting unit 17 determines whether at least one of the recognized white lines is a dashed line. When at least one of the recognized white lines is a dashed line, the process proceeds to step S24. When none of the recognized white lines are dashed lines, the process proceeds to step S25.

In step S24, the specific event detecting unit 17 enlarges the evaluation target lane so as to include the adjoining lane on the dashed line side.

In step S25, the specific event detecting unit 17 finalizes the evaluation target lane.

In step S26, the specific event detecting unit 17 predicts the future traveling locus of the vehicle 3 based on the yaw rate of the vehicle 3. The specific event detecting unit 17 determines a region having a certain width centering the future traveling locus as the evaluation target lane.

In step S27, the specific event detecting unit 17 determines whether the vehicle 3 is changing lanes. The specific event detecting unit 17 can determine, for example, whether the vehicle 3 is changing lanes based on locational information, map information, and steering amount information on the vehicle 3. When the vehicle 3 is changing lanes, the process proceeds to step S28. When the vehicle 3 is not changing lanes, the process proceeds to step S25.

In step S28, the specific event detecting unit 17 enlarges the evaluation target lane so as to include the adjoining lane which is the lane change destination.

Returning to FIG. 4, in step S13, the specific event detecting unit 17 determines whether the unrecognized target is in the evaluation target lane. When the unrecognized target is in the evaluation target lane, the process proceeds to step S14. When the unrecognized target is not in the evaluation target lane, the unrecognized event detecting process terminates.

In step S14, the specific event detecting unit 17 determines whether the unrecognized target is a moving object. A moving object is a target that is moving. When the unrecognized target is a moving object, the process proceeds to step S18. When the unrecognized target is not a moving object, the process proceeds to step S15. Incidentally, when proceeding to step S15, the unrecognized target is a stationary object. A stationary object is a target that is stationary.

In step S15, the specific event detecting unit 17 determines whether the distance between the vehicle 3 and the unrecognized target is equal to or greater than a threshold value. When the distance between the vehicle 3 and the unrecognized target is less than the threshold value, the process proceeds to step S16. When the distance between the vehicle 3 and the unrecognized target is equal to or greater than the threshold value, the process proceeds to step S17.

In step S16, the specific event detecting unit 17 determines whether the camera 11 recognizes the unrecognized target as a vehicle. When the camera 11 recognizes the unrecognized target as a vehicle, the process proceeds to step S18. When the camera 11 does not recognize the unrecognized target as a vehicle, the unrecognized event detecting process terminates.

Incidentally, to determine in the affirmative in step S16 corresponds to having an unrecognized event. The camera 11 corresponds to a second sensor. The unrecognized target corresponds to a first target. When determining in the affirmative in step S16, the camera 11 recognizes the unrecognized target, and the evaluation target sensor 5 does not recognize the unrecognized target.

In step S17, the specific event detecting unit 17 determines whether the millimeter-wave radar 7 and the LiDAR 9 recognize the unrecognized target. When the millimeter-wave radar 7 and the LiDAR 9 recognize the unrecognized target, the process proceeds to step S18. When the millimeter-wave radar 7 or the LiDAR 9 does not recognize the unrecognized target, the unrecognized event detecting process terminates.

Incidentally, to determine in the affirmative in step S17 corresponds to having the unrecognized event. The millimeter-wave radar 7 and the LiDAR 9 correspond to the second sensor. The unrecognized target corresponds to the first target. When determining in the affirmative in step S17, the millimeter-wave radar 7 and the LiDAR 9 recognize the unrecognized target, and the evaluation target sensor 5 does not recognize the unrecognized target.

In step S18, the specific event detecting unit 17 detects the unrecognized event.

Returning to FIG. 3, in step S2, the specific event detecting unit 17 performs the unrecognized event detecting process. The unrecognized event detecting process will be explained based on FIG. 6.

Figure 6:
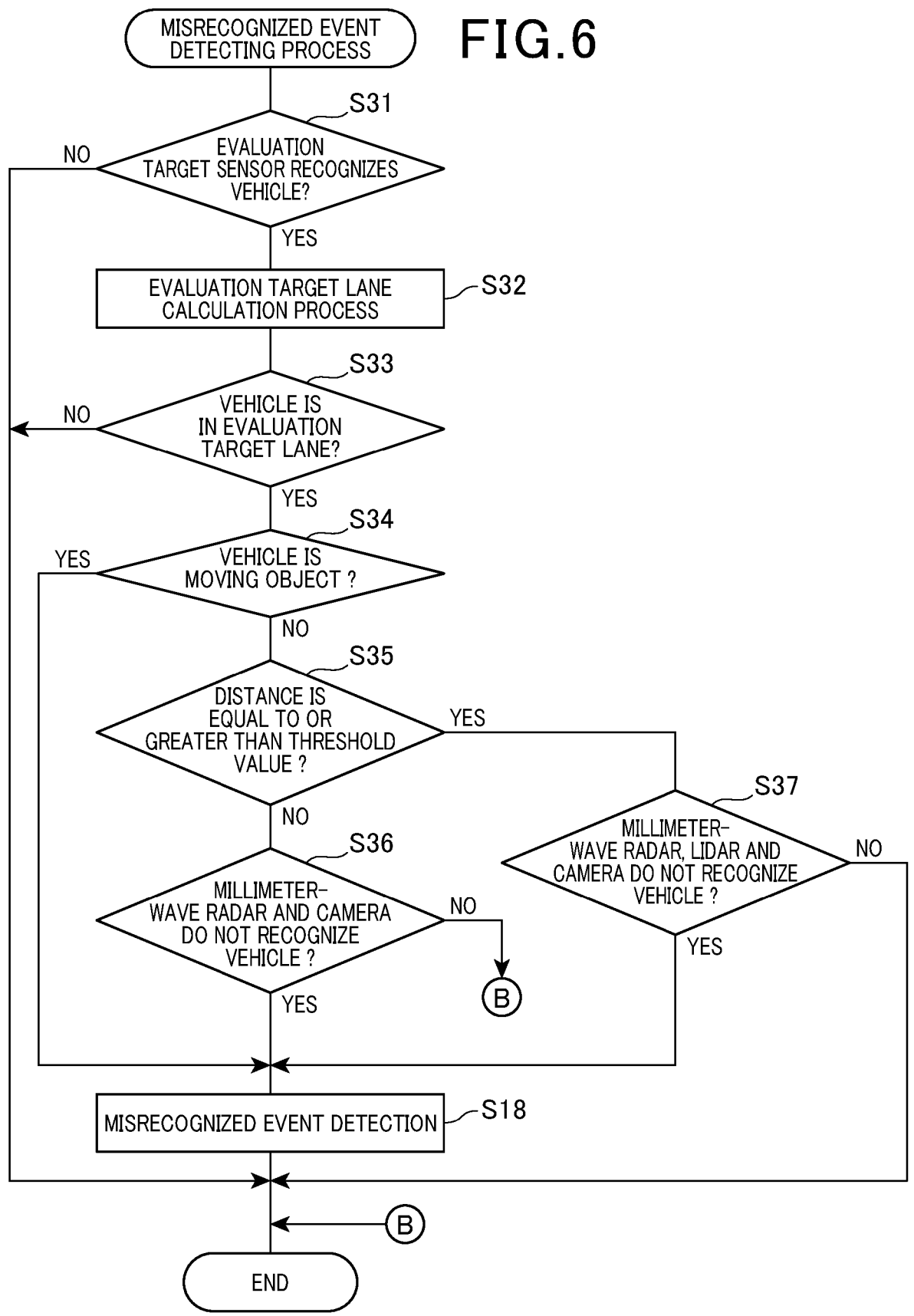
FIG. 6 is flowchart showing the misrecognized event detecting process that the sensor evaluation device performs.

In step S31 of FIG. 6, the specific event detecting unit 17 obtains the recognition results of the target from the evaluation target sensor 5, millimeter-wave radar 7, LiDAR 9, and camera 11. The specific event detecting unit 17 determines whether the evaluation target sensor 5 recognizes a vehicle. When the evaluation target sensor 5 recognizes a vehicle, the process proceeds to step S32. When the evaluation target sensor 5 does not recognizes a vehicle, the misrecognized event detecting process terminates. Incidentally, the vehicle that the evaluation target sensor 5 recognized is hereafter referred to as a recognized vehicle.

In step S32, the specific event detecting unit 17 performs the evaluation target lane calculation process. The evaluation target lane calculation process is the same as the above step S12.

In step S33, the specific event detecting unit 17 determines whether the recognized vehicle is in the evaluation target lane. When the recognized vehicle is in the evaluation target lane, the process proceeds to step S34. When the recognized vehicle is not in the evaluation target lane, the misrecognized event detecting process terminates.

In step S34, the specific event detecting unit 17 determines whether the recognized vehicle is a moving object. When the recognized vehicle is a moving object, the process proceeds to step S38. When the recognized vehicle is not a moving object, the process proceeds to step S35. Incidentally, when proceeding to step S35, the recognized vehicle is a stationary object.

In step S35, the specific event detecting unit 17 determines whether the distance between the vehicle 3 and the recognized vehicle is equal to or greater than the threshold value. When the distance between the vehicle 3 and the recognized vehicle is less than the threshold value, the process proceeds to step S36. When the distance between the vehicle 3 and the recognized vehicle is equal to or greater than the threshold value, the process proceeds to step S37.

In step S36, the specific event detecting unit 17 determines whether the millimeter-wave radar 7 and camera 11 recognize the recognized vehicle. When the millimeter-wave radar 7, and camera 11 do not recognize the recognized vehicle, the process proceeds to step S38. When the millimeter-wave radar 7 or camera 11 recognizes the recognized vehicle, the misrecognized event detecting process terminates. The millimeter-wave radar 7 and camera 11 correspond to sensors other than the LiDAR 9.

Incidentally, to determine in the affirmative in step S36 corresponds to having a misrecognized event. The millimeter-wave radar 7, and camera 11 correspond to the second sensor. The recognized vehicle corresponds to the second target. When determining in the affirmative in step S36, the evaluation target sensor 5 recognizes the recognized vehicle, and the millimeter-wave radar 7 and camera 11 do not recognize the recognized vehicle.

In step S37, the specific event detecting unit 17 determines whether the millimeter-wave radar 7, LiDAR 9, and camera 11 recognize the recognized vehicle. When the millimeter-wave radar 7, LiDAR 9, and camera 11 do not recognize the recognized vehicle, the process proceeds to step S38. When the millimeter-wave radar 7, LiDAR 9, and camera 11 recognize the recognized vehicle, the misrecognized event detecting process terminates.

Incidentally, to determine in the affirmative in step S37 corresponds to having a misrecognized event. The millimeter-wave radar 7, LiDAR 9, and camera 11 correspond to the second sensor. The recognized vehicle corresponds to the second target. When determining in the affirmative in step S37, the evaluation target sensor 5 recognizes the recognized vehicle, and the millimeter-wave radar 7, LiDAR 9, and camera 11 do not recognize the recognized vehicle.

In step S38, the specific event detecting unit 17 detects a misrecognized event.

Returning to FIG. 3, in step S3, the specific event detecting unit 17 determines whether a specific event is detected. The specific event includes an unrecognized event and a misrecognized event. Of the unrecognized event and the misrecognized event, when either one is detected, it is considered that the specific event is detected. When the specific event is detected, the process proceeds to step S4. When the specific event is not detected, the process terminates.

In step S4, a notifying unit 21 performs the notification using a monitor 25. The contents of the notification include, for example, occurrence of a specific event. Moreover, contents of the notification include, for example, which one of an unrecognized event or a misrecognized event is the specific event. Moreover, when an unrecognized event occurs, the contents of the notification may include, for example, the location of an unrecognized target. Aspects showing the location of the unrecognized target may include, for example, an aspect showing the location of the unrecognized target overlappingly in the image showing the scenery of the surroundings of a vehicle 3.

Moreover, when a misrecognized event occurs, the contents of the notification may include, for example, the location of a recognized vehicle. Aspects showing the location of a recognized target may include, for example, an aspect showing the location of the recognized vehicle overlappingly in the image showing the scenery of the surroundings of a vehicle 3.

Moreover, the notifying unit 21 displays a first choice and a second choice on the monitor 25. When an operator determines that a specific event is in fact occurring, the first choice shows what the operator fed to an input device 27 (hereafter referred to as the first input). When the operator determines that a specific event is not in fact occurring, the second choice shows what the operator fed to the input device 27 (hereafter referred to as the second input).

The first input means, for example, the operator pushes the "YES" region displayed on the monitor 25. Moreover, the second input means, for example, the operator pushes the "NO" region displayed on the monitor 25. In this case, the input device 27 is a touch panel overlappingly displayed on the monitor 25.

In step S5, the input unit 23 determines whether any input the operator performed on the input device 27 is accepted. When any input is accepted, the process proceeds to step S6. When no input is accepted, the process proceeds to step S8.

In step S6, the input unit 23 determines whether the accepted input is the first input. When the accepted input is the first input, the process proceeds to step S7. When the accepted input is not the first input, the process terminates.

In step S7, the recording unit 19 records the log on the memory 15. The content of the log includes, for example, information showing the occurrence of a specific event, information showing the presence or absence of the occurrence of an unrecognized event, information showing the presence or absence of the occurrence of a misrecognized event, information showing the time a specific event occurred, and information showing the place a specific event occurred. Moreover, the content of the log includes, for example, information showing which sensor recognized the unrecognized target among the millimeter-wave radar 7, LiDAR 9, and camera 11 when an unrecognized event occurred, information showing which sensor recognized the recognized vehicle among the millimeter-wave radar 7, LiDAR 9, and camera 11 when a misrecognized event occurred, information showing the weather, ambient light and the like when a specific event occurred, information showing the state of vehicle 3 when a specific event occurred and the like. The log corresponds to the information regarding the specific event.

In step S8, the input unit 23 determines whether a certain time period has elapsed from the time the notification of the step S4 started. When the certain time period has elapsed, the process proceeds to step S9. When the certain time period has not elapsed yet, the process proceeds to step S5.

In step S9, the notifying unit 21 generates an alarm sound using the speaker 28.

(3) Effects Produced by the Sensor Evaluation Device 1

(1A) The sensor evaluation device 1 can detect a specific event. The sensor evaluation device 1 can record a log when a specific event is detected. For example, a user can evaluate the evaluation target sensor 5 by analyzing a recorded log.

(1B) The sensor evaluation device 1 notifies an operator when a specific event is detected. The operator determines whether a specific event in fact occurred, and performs the first input when the operator determines the specific event in fact occurred. The sensor evaluation device 1 records the log on the condition that the first input is accepted. As such, the sensor evaluation device 1 can restrict recording the log when the specific event in fact did not occur.

(1C) The evaluation target sensor 5, millimeter-wave radar 7, LiDAR 9, and camera 11 are mounted on the vehicle 3. As such, the sensor evaluation device 1 can perform the evaluation of the evaluation target sensor 5 mounted on the vehicle 3.

(1D) The camera 11 can precisely recognize a short-range target. The sensor evaluation device 1 detects an unrecognized event on the condition that the camera 11 recognizes an unrecognized target when the distance from the vehicle 3 to the unrecognized target is less than the threshold value. As such, the sensor evaluation device 1 can further precisely detect an unrecognized event.

Moreover, the millimeter-wave radar 7 and LiDAR 9 can precisely recognize a long-range target. The sensor evaluation device 1 detects an unrecognized event on the condition that the millimeter-wave radar 7 and LiDAR 9 recognize an unrecognized target when the distance from the vehicle 3 to the unrecognized target is equal to or greater than the threshold value. As such, the sensor evaluation device 1 can further precisely detect an unrecognized event.

(1E) When the recognized vehicle is close to the vehicle 3, the LiDAR 9 may recognize the exhaust gas of the recognized vehicle as a target. The sensor evaluation device 1 detects a misrecognized event on the condition that sensors other than the LiDAR 9 do not recognize the recognized vehicle when the distance from the vehicle 3 to the recognized vehicle is less than the threshold value. As such, the sensor evaluation device 1 can further precisely detect a misrecognized event.

OTHER EMBODIMENTS

Embodiments of the present disclosure are explained above, but the present disclosure is not limited to the above embodiments and can be implemented in various transformations.

(1) The evaluation target sensor 5, millimeter-wave radar 7, LiDAR 9, and camera 11 may be mounted on a sensor-mounting object other than the vehicle 3. A sensor-mounting object other than the vehicle 3 may be, for example, a fixed object and the like set at a location facing the street.

(2) The vehicle 3 may be provided with a sonar in addition to or partly in place of the millimeter-wave radar 7, LiDAR 9, and camera 11. Moreover, the vehicle 3 may be provided with a sensor unit consisting of a combination of GPS and map information.

(3) The sensor evaluation device 1 may always keep a log when determination in the affirmative is made in the above step S3.

(4) The sensor evaluation device 1 may detect only one of an unrecognized event or a misrecognized event.

(5) The first sensor and the second sensors may be appropriately selected from among well-known sensors.

(6) The first target and the second target may be targets other than vehicles. The first target and the second target may be present outside of the evaluation target lane.

(7) The sensor evaluation device 1 and its method described in the present disclosure may be realized by an exclusively used computer provided so as to constitute a processor and a memory programed to execute one or a plurality of functions specified by a computer program. Alternatively, the sensor evaluation device 1 and its method described in the present disclosure may be realized by an exclusively used computer provided so as to constitute a processor by one or more exclusively used hardware logic circuit. Or, the sensor evaluation device 1 and its method described in the present disclosure may be realized by one or more exclusively used computers constituted by a combination of a processor and a memory programed to execute one or a plurality of functions, and a processor constituted by one or more hardware logic circuit. Moreover, the computer program may be stored in a computer-readable non-transition material storage medium as an instruction that can be executed by a computer. The method for realizing the function of each part of the sensor evaluation device 1 does not necessarily include software, and the entire function may be realized using one or a plurality of hardware.

(8) A plurality of functions that one element has in the above embodiments may be realized by a plurality of elements, or one function that one element has may be realized by a plurality of elements. Moreover, a plurality of functions that a plurality of elements have may be realized by one element, or one function realized by a plurality of elements may be realized by one element. Moreover, portions of the configurations of the above embodiments may be abbreviated. Moreover, at least portions of the configurations of the above embodiments may be added to or substituted for the configurations of other above embodiments.

(9) Other than the above the sensor evaluation device 1, the present disclosure can be realized in various aspects, for example, a system having the sensor evaluation device 1 as an element, a program for causing a computer to function as the sensor evaluation device 1, a non-transition substantive storage medium such as a semiconductor memory recording the program, a sensor evaluation method and others.

What is claimed is:

1. A sensor evaluation device, which is a sensor evaluation device configured to evaluate a first sensor mounted on a sensor-mounting object, comprising:

a specific event detecting unit configured to:

(a) perform an unrecognized event detecting process which detects an unrecognized event where a second sensor mounted on the sensor-mounting object recognizes a first target whereas the first sensor does not recognize the first target, the second sensor including a camera in the unrecognized event detecting process in response to a first distance between the sensor-mounting object and the first target being less than a first threshold value, and (b) perform a misrecognized event detecting process a misrecognized event where the first sensor recognizes a second target whereas the second sensor does not recognize the second target, the second sensor including a LiDAR or a millimeter-wave radar in the misrecognized event detecting process in response to a second distance between the sensor-mounting object and the second target being equal to or greater than a second threshold value; and a recording unit configured to record information on the specific event when the specific event detecting unit detects as the specific event at least one of the unrecognized event and the misrecognized event.

2. The sensor evaluation device according to claim 1, further comprising:

a notifying unit configured to inform detection of one or more of the unrecognized event or the misrecognized event to an operator when the specific event detecting unit detects one or more of the unrecognized event or the misrecognized event; and an input unit configured to receive an input by the operator, wherein, the recording unit is configured to record information on one or more of the unrecognized event or the misrecognized event on condition that the input unit receives the input after the notifying unit informs the detection.

3. The sensor evaluation device according to claim 1, wherein the sensor-mounting object is a vehicle.

4. The sensor evaluation device according to claim 1, wherein the first sensor and the second sensors each include one or more selected from a group consisting of a camera, LiDAR, millimeter-wave radar, and sonar.

5. The sensor evaluation device according to claim 1, wherein the second sensor includes a millimeter-wave radar or the LiDAR in the unrecognized event detecting process when a distance between the sensor-mounting object and the first target is equal to or greater than the first threshold value.

6. The sensor evaluation device according to claim 1, wherein the second sensor includes a sensor other than the LiDAR in the misrecognized event detecting process when a distance between the sensor-mounting object and the first target is less than the second threshold value.

* * * * *